United States Patent Office 3,194,294
Patented July 13, 1965

3,194,294
STABLE PRE-PREPARED CORD DIP
Gerard E. van Gils, Cuyahoga Falls, Ohio, assignor to The General Tire & Rubber Company, Akron, Ohio, a corporation of Ohio
No Drawing. Filed Nov. 21, 1961, Ser. No. 154,064
19 Claims. (Cl. 152—330)

This invention relates to an improved process for the bonding of textile fabrics, filament cords and the like to vulcanized rubber structures. More particularly, this invention relates to a method of preparing a stable adhesive dip bath for tire cords by means of a concentrate of a rubber latex containing a resorcinol-formaldehyde condensation product which concentrate can be easily transported and stored for relatively long periods before use, whereby, once the concentration is diluted, the bath can be used as a dip bath without addition of compounding agents.

Rubber latices compounded with substantial amounts of resorcinol-formaldehyde resin have been used for adhering fabric, and particularly cord fabric, to rubber for many years. Adhesives in which the rubber latices comprise at least in part a copolymer of a vinyl pyridine and a diolefin, such as butadiene have superior adhesion to nylon and certain synthetic fibers.

In the preparation of such compounded latices for rubber-to-fabric adhesives, it has been considered to be necessary to either prepare a heat hardenable resorcinol-formaldehyde condensate in the latex either by adding the formaldehyde and resorcinol in correct proportions just prior to applying it to the fabric, or by incorporating resorcinol-formaldehyde condensate into the latex together with alkaline material and additional formaldehyde, within a few hours of the application of the latex compound to the fabric.

The final compounding of the latex in the factory just prior to use has some disadvantages because of the tendency for mistakes and resultant impairment of the final article, such as a tire. When attempts were made to incorporate the proper amounts of resin and formaldehyde or formaldehyde-producing substances in the latex, and particularly in vinyl pyridine-containing latices long prior to use thereof, the stability of the latex was impaired and also the resorcinol formaldehyde resin advanced to a state where it was not suitable for improving adhesion.

It is an object of the present invention to provide a completely compounded rubber latex base which can be transported, stored, diluted with water and used for strongly adhering rubber to tire cords without requiring further addition of compounding agents.

It is an object to provide a method of preparing a latex base adhesive containing an aqueous dispersion of a copolymer of a diolefine and vinyl pyridine and also containing a resorcinol-formaldehyde heat-hardening resin for bonding cords to rubber tire carcasses which can be used for relatively long periods of time after it is made up.

Other objects of this invention will be apparent from the description that follows and from the appended claims.

I have found that a stable concentrated latex base adhesive which need only be diluted with water to form a working dip bath, which bath is used for strongly bonding fabrics to natural rubber and synthetic elastomers, may be prepared by incorporating in the latex a resorcinol-formaldehyde condensate, containing only a portion of the formaldehyde needed to produce a heat hardened resin, together with a water soluble methylol-containing formaldehyde donor having more methylol groups than are stable therein at elevated temperature.

When the polymethylol compound is a suitable methylol derivative the resultant bath may be used many days after its preparation without coagulation of the latex occurring.

The concentrates of the present invention are preferably prepared by initially making a non-heat hardenable prepolymer of resorcinol and substantially less than equivalent molar amount of formaldehyde in the presence of dilute sodium hydroxide solution. The resorcinol and formaldehyde is preferably heated to cause initial reaction and thereafter combined with a latex such as a butadiene-vinyl pyridine copolymer containing, in the combined state with said butadiene, 5% to 35% of vinyl pyridine and 15 to 50% total of monoolefine. In addition to the above latex and resin, enough of a water soluble, water stable compound which releases formaldehyde upon heating is used to provide about equal moles or more of total formaldehyde for the amount of resorcinol used. By using the above method, a dip bath can be obtained which is stable almost indefinitely since the completion of the resin formation is advantageously held off until the curing step provides sufficient heat to release formaldehyde from the formaldehyde donating compound.

Polyhydric phenols such as resorcinol preferably form the entire phenolic constituent of the resin in the adhesives of the present invention, although part, up to ½, may be substituted by any phenol or substituted phenol having ortho positions free of substitutions. The phenolic base resin-forming materials are preferably used with a basic catalyst such as the hydroxides and sulfites of sodium, potassium and ammonia. These resins or prepolymer resins, while soluble in water when incorporated in the latex, polymerize or set up rapidly at temperatures of about 250 to 300° F. or less into an insoluble form when the total formaldehyde present is enough to provide about a 1:1 molar ratio of formaldehyde to phenolic compound although molar ratios of aldehyde to phenolic compound may be used in the range of about .9/1 to 1.2/1.

About 25 to 75 mole percent of the total amount of formaldehyde required for good bonding properties (heat hardenability) is generally supplied in the initial water-soluble formaldehyde-resorcinol resin prepolymer or as a combination of prepolymer, formaldehyde and resorcinol. The balance, or about 25–75 mole percent or more of the total formaldehyde required is supplied by the formaldehyde donor. Preferably 30 to 50 percent of the formaldehyde is supplied by the donor formaldehyde-releasing compound, and optimum properties of both stability and fabric to rubber bonding are obtained when about 60 percent (usually about 0.6 mole) of formaldehyde are incorporated per mole of resorcinol as a prepolymer and the remainder (at least .35 mole) and preferably .4 mole or more incorporated by the methylol-containing formaldehyde donor.

The formaldehyde donors are water soluble and also must be stable in aqueous solution so as not to break down and release formaldehyde before the proper time; i.e., under the influence of heat during subsequent processing. Likewise, the formaldehyde releasing agents should readily give up or liberate formaldehyde upon heating so as to complete the resinification of the resorcinol-formaldehyde resin. The completion of resinification and conversion of the phenol-aldehyde polymers to one that is thermosetting takes place at the temperatures of conventional rubber curing operations, say at 200 to 400° F. for 15 to 40 minutes. It is understood that the time and temperature factors relating to drying the treated fabric or curing the elastomer may be varied from those ordinarily used in the manufacture of tires and belting in order to obtain substantial polymerization of slower reacting resin forming materials that may be used in the treating composition. However, it is desirable that the temperature be raised to at least 175 to 180° F. about 10 or 15 minutes or preferably longer in order to complete the resinification reaction when using the aldehyde donating agent according to the present invention.

Preferred formaldehyde donating compounds are methylol derivatives of urea or urea derivatives such as trimethylol melamine, (trimethylol cyanureatriazine) tetramethylol melamine, and mixtures thereof. Other derivatives of urea suitable as formaldehyde donors which release formaldehyde to react with resorcinol to form a heat hardening resin are dimethyl hydantoin formaldehyde resin, monomethylol dimethyl hydantoin, and dimethylol urea. These materials are characterized by having

groups and at least one methylol group. Polymethylol phenols such as trimethylol phenol have been found unsatisfactory for use in accordance with the present invention since such compounds adversely affect the stability of the latex, perhaps because of the acidity of the phenol residue, so that subsequent bonds are not consistently strong and are relatively weak.

It has also been found that a pH of about 9-11 is preferred for the diluted dip bath. Since the pH may drop as the bath stands, it is advantageous to add ammonia or other suitable base to increase the pH to the preferred range.

The following examples illustrate the present invention:

EXAMPLE 1

A solution containing a mixture of trimethylol and tetramethylol melamines was prepared according to the formula:

| Ingredient | Grams | Moles |
|---|---|---|
| Melamine | 12.6 | 0.1 |
| Formaldehyde (35%) | 34.7 | 0.4 |
| Water | 50 | |

The solution was prepared by first heating the water to 70° C. and then adding the melamine powder and formaldehyde. The solution was heated and strained until all the melamine had dissolved. The resultant solution was a mixture of tri- and tetra-methylol melamines, since some of the formaldehyde was lost during the preparation.

EXAMPLE 2

The formaldehyde donating solution of Example 1, hereinafter called a trimethylol melamine, was used to make a dip bath according to the following formula:

*Table I*

| Ingredient | Parts by weight | |
|---|---|---|
| | Grams | Moles |
| Smooth rubber latex (33⅓% solids) copolymer of 75/25 butadiene/vinyl pyridine | 300 | |
| Resorcinol | 11 | 1/10 |
| Formaldehyde | 1.5 | 1/20 |
| NaOH | 0.1 | |
| Water | 32 | |
| Trimethylol melamine | 3.6 | 1/60 |

It can be seen in Table I that one-half the amount of formaldehyde required to form a 1 to 1 molar ratio with the resorcinol used is originally present to form a water soluble medium molecular weight resin. The balance of the formaldehyde required to complete the resinification to obtain good adhesive properties is furnished to the bath in the form of the formaldehyde donor.

Good adhesion between nylon fabric and natural rubber was obtained by using the above bath. The bath was used for many days beyond the usual dip bath life without loss of adhesive properties or bath stability.

EXAMPLE 3

A solution of trimethylol melamine as described was prepared by a procedure similar to that of Example I but according to the formula of Table II.

*Table II*

| Ingredient | Parts by weight | Moles |
|---|---|---|
| Melamine | 12.6 g | 0.1 |
| Formaldehyde (35%) | 26 g | 0.3 |
| Water | 50 ml | |

In preparing the above trimethylol melamine solution, the water was heated to about 70° C. whereupon the liquid formaldehyde and melamine powder were added to the water and stirred in. The resulting solution was then used to prepare the dip baths used in Tables III and IV.

A resorcinol-formaldehyde resin solution deficient in formaldehyde was prepared by dissolving 11 grams of resorcinol in a mixture of 5 ml. of 35 percent by weight formaldehyde and 10 ml. of 1 percent sodium hydroxide. The mixture was heated at 70° C. and then cooled, whereupon 18 ml. of water was added.

The above solutions were then used to prepare latex base dip baths for adhering nylon cord to natural rubber tire carcass stock. The trimethylol melamine and resorcinol-formaldehyde resin solutions were mixed with water and the rubber latex and used for treating nylon cords. Table III shows the relative proportions of the ingredients.

*Table III*

| | Dip No. | | | |
|---|---|---|---|---|
| | I | II | III | IV |
| 33% rubber latex (butadiene/vinyl pyridine copolymer) ml | 300 | 300 | 300 | 300 |
| Water, ml | 60 | 60 | 60 | 60 |
| Resorcinol-formaldehyde solution, ml | 20 | 20 | 20 | 20 |
| Trimethylol melamine solution, ml | | | 5 | 8 |
| Formaldehyde 35%, ml | 6 | | | |

Nylon cords were dipped in the above baths on the same day that they were prepared and cured between layers of suitable rubber carcass stock according to customary practice for adhesion tests. The adhesive properties of the dip baths were also tested after 11 days, 35 days, 73 days and 82 days as indicated in Table IV. The samples were all cured at about 287° F. for 25 minutes. The adhesion in pounds is the force required to pull the cord from between layers of rubber.

*Table IV*

| | Control | Dip No. | | | |
|---|---|---|---|---|---|
| | | I | II | III | IV |
| First day | 20.4 | 26.5 | 21.8 | 22.4 | 21.7 |
| 11 days after make-up | | 16.7 | 25.1 | 28.0 | 22.3 |
| 35 days | 15.3 | | 22.0 | 24.0 | 22.7 |
| 73 days | 25.2-32.7 | | | 25.2 | 20.2 |
| 82 days (before NH₃ addition) | 29.0-32.7 | | | 20.8 | |
| 82 days (after NH₃ addition) | | | | 30.4 | |

Dip No. III had a pH of 8.3 before addition of NH₃ and a pH of 10.4 after addition.

It can be seen that Dip No. I contained free formaldehyde and that its bonding properties depreciated rapidly upon standing, apparently due to further resinification upon standing. The control dip of Table IV was prepared by using 300 ml. of the 33% rubber latex as shown in Table III, 60 ml. of water and 20 ml. of a resorcinol-formaldehyde solution prepared as described for Dips I through IV of this Example 3 except that 10 ml. of 35% formaldehyde was used so that the resorcinol-formaldehyde molar ratio was about 1:1.

Dip No. II, containing less formaldehyde than required to make a 1 to 1 molar ratio with resorcinol, provided good adhesion properties upon testing under relatively cool condition room temperature. However, Dip No. II provided poor adhesion when tested hot apparently indicating that the resin was still thermoplastic in nature rather than thermosetting which is necessary in tires and the like.

Dip Nos. III and IV containing formaldehyde donors in accordance with the present invention show the best adhesive properties. Dip III is outstanding. It can be seen that there is loss in adhesion shown by Dip III upon aging and that, by addition of $NH_3$ to control pH, excellent adhesion was restored.

EXAMPLE 4

A series of dip baths were prepared as Dip III of Example 3 except that various formaldehyde donating compounds were used in the bath as indicated in Table V. The total amount of formaldehye donor used in each bath was 20 grams of a 10 percent by solution in water per 100 grams dry weight of a 75/25 butadiene/vinyl pyridine copolymer latex (40 percent solids content).

Results of adhesion tests conducted on nylon fabric-natural rubber carcass stock in a manner similar to that discussed in Example III are shown below:

*Table V*

| Dip bath No. | Formaldehyde donating compound | Average "H" adhesion values (lbs.) | | | |
|---|---|---|---|---|---|
| | | After 38 days | | After 47 days | |
| | | Sample A | Sample B | Sample A | Sample B NH₃ added |
| C | Dimethyl Hydantoin Formaldehyde resin | 27.3 | 25.6 | 24.0 | 28.2 |
| D | Trimethylol melamine | 21.9 | 27.6 | 25.2 | 30.0 |
| E | Dimethylol urea | 17.0 | 20.2 | | |

In the foregoing examples, the resorcinol may be substituted by other polyhydroxy phenols such as those having hydroxyl groups attached to a benzene nucleus at a position meta with each other. It is preferred that the proportion of phenolic resin compound in the latex treating solution be about 8 to 15 percent by weight based on rubber solids. As low as ½% of the resorcinol compound in the treating solution gives a beneficial effect and as much as 30% based on the rubber solids may be used. If no rubber solids are present then the resinous constituents, i.e., the total resin forming constituents should preferably be about 1% to 10% of the aqueous solution.

The formaldehyde in the above examples may be substituted for in part by other aldehydes such as acetaldehyde and furfural, although formaldehyde is preferred. As previously indicated the aldehyde should be used in amounts very close to a 1:1 molar ratio with the polyhydroxyl phenolic compound, the preferred range being 1.0 to 1.1 moles of aldehyde per mole of phenolic compound. The slight excess of aldehyde is preferred so that all the phenol will be reacted so as to eliminate danger of any excess phenol altering the curing step.

The methods of the present invention are particularly well suited for the treatment of synthetic fibers such as nylon and Dacron. Dacron is an oriented fiber of a polyester formed from ethylene glycol and terephthalic acid (polyethylene terephthalate fiber oriented along the fiber axis). The preferred fiber is an oriented fiber of long-chain linear polymeric amides, such as the condensation product of hexamethylene diamine and adipic acid (polyhexamethylene adipamide or Type 66 nylon). However, oriented polycaprylactam which is commonly called Perlon or Type 6 nylon can also be used in place thereof. The term "nylon" may therefore be construed to include both hexamethylene adipamide and polycaprolactam whenever employed in this application.

Examples of phenol-aldehyde resins which may be used are crotonaldehyde-resorcinol resin, and furfural-resorcinol resin although resorcinol-formaldehyde resins are preferred for the best bonding properties. Also when formaldehyde is used, it may be added to the initial resin forming mixture in the form of paraformaldehyde.

In the above examples, natural rubber may also be used or may be substituted in whole or in part by other rubbery polymers of conjugated diolefinic compounds having less than 7 carbon atoms including polyisoprene, polybutadiene, neoprene, and copolymers of a diolefinic compound with a monoolefine including butadiene-styrene copolymers and other synthetic rubbers.

In the above examples, the particular butadiene/vinyl pyridine rubbery copolymers used may be substituted in whole or in part by other rubbery copolymers of a conjugated diolefin of less than 7 aliphatic carbon atoms and a vinyl pyridine including unsubstituted vinyl pyridine and alkyl substituted vinyl pyridines. Suitable vinyl pyridines are 2-vinyl pyridine and 5-ethyl-2-vinyl pyridine. Aqueous dispersions of a terpolymer of about 75 parts of butadiene (or isoprene), 15 parts of styrene, and 10 parts of a vinyl pyridine are particularly desirable either alone or in admixture with aqueous dispersions of the copolymer of butadiene and styrene.

In the above examples, the nylon fabric may be substituted for by other high melting synthetic fibers such as polyethylene terephthalate or viscose rayon and cotton fibers although the invention is best suited to the treatment of nylon and Dacron.

This application is a continuation-in-part of my co-pending application Serial No. 733,479 filed May 7, 1958, now abandoned.

It is obvious that many changes and modifications of the invention can be made within the nature and spirit thereof.

Having described my invention, I claim:

1. A method of bonding a fabric to a rubbery polymer of a diolefinic compound comprising the steps of applying to the fabric an alkaline aqueous dispersion comprised of (1) a latex of a rubbery polymer of a conjugated diolefin of less than 7 carbon atoms, (2) a solution of a water-soluble alkaline-catalyzed dihydroxy-phenol-formaldehyde resole resin having about .25 to .75 mole of formaldehyde per mole of the dihydroxy phenolic compound, (3) ammonia, and (4) a water-stable water-soluble formaldehyde-donating compound having $$\begin{matrix} H \\ -N- \end{matrix}$$

groups and at least one methylol group and which releases enough formaldehyde upon heating to make the total formaldehyde to phenolic compound molar ratio about 0.9:1 to 1.2:1, said aqueous dispersion having a pH of at least 9, calendering the rubber to the fabric, and thereafter vulcanizing the rubber by application of heat.

2. A method as defined in claim 1 wherein said aqueous mixture is stored for at least 11 days before being applied to the fabric.

3. A method of bonding a fabric to a rubber comprising the steps of applying to the fabric an aqueous mixture comprised of (1) a solution of a water-soluble alkaline-catalyzed resorcinol-formaldehyde resole resin having about .25 to .75 mole of formaldehyde per mole of resorcinol, (2) a latex of a rubbery copolymer of a conjugated diolefin having less than 7 aliphatic carbon atoms and a vinyl pyridine, (3) ammonia, and (4) a water-soluble water-stable formaldehyde-donating ring compound containing an

group and at least one methylol group and which releases enough formaldehyde upon heating to at least 180° F. to provide a total amount of formaldehyde in the range of about 0.9 to 1.2 moles formaldehyde per mole of resorcinol, applying the rubber under pressure to the fabric, and thereafter subjecting the fabric and rubber to a vulcanizing temperature which is at least 180° F.

4. A method as defined in claim 3 wherein said formaldehyde-donating compound is a reaction product of melamine and formaldehyde and said fabric is formed of nylon.

5. A stable dip bath used for bonding fabric to rubber comprising an alkaline aqueous solution of (1) a water-soluble alkaline-catalyzed resorcinol-formaldehyde resole resin having about .25 to .75 mole of a formaldehyde per mole of resorcinol (2) a latex of a rubbery copolymer of a conjugated diolefine having less than 7 carbon atoms and a vinyl pyridine and (3) a water-soluble formaldehyde donating compound having

groups and at least one methylol group and which releases upon heating enough formaldehyde to form a water-insoluble infusible resorcinol-formaldehyde resin upon heating, and (4) an amount of ammonia sufficient to provide a pH of at least 9.

6. A dip bath as defined in claim 5 wherein said formaldehyde-donating compound is a heterocyclic urea derivative consisting solely of carbon, hydrogen, nitrogen and oxygen atoms, each nitrogen atom being directly connected to two carbon atoms, the only atoms in the ring being carbon and nitrogen atoms, the only functional groups being methylol and —HN— groups.

7. A stable alkaline concentrate for a tire cord dip bath which can be easily stored, transported and diluted to a suitable colume comprising (1) a latex of a rubbery copolymer of butadiene and a vinyl pyridine (2) a water-soluble alkaline-catalyzed resorcinol-formaldehyde resole resin having about 0.5 mole of formaldehyde per mole of resorcinol, and (3) a water-soluble water stable compound having

groups and at least one methylol group and capable of releasing upon heating at least about 0.5 mole of formaldehyde which further reacts with the water soluble resin to form a water insoluble infusible resin, said concentrate being essentially free of unreacted formaldehyde.

8. A method of bonding a fabric to a rubber comprising the steps of (a) forming an alkaline treating solution with a pH of about 9 to 11 which contains (1) a latex of a butadiene-vinylpyridine copolymer, (2) an alkali-catalyzed water-soluble dihydroxy-phenol-formaldehyde resin having a molar ratio of formaldehyde to phenol of 0.25:1 to 0.75:1, (3) ammonia, and (4) a water-soluble formaldehyde-donating compound which breaks down upon heating to release enough formaldehyde to react with said water-soluble resin to form a water-insoluble infusible resin upon heating, said formaldehyde-donating compound being a ring compound containing at least one methylol group and at least one

group, (b) applying said treating solution to fabric, (c) drying the solution-treated fabric, (d) applying rubber to said dried fabric, and (e) thereafter vulcanizing the rubber by application of heat.

9. A method as defined in claim 8 wherein the amount of ammonia is sufficient to raise the pH from 8.3 to 10.4.

10. A method as defined in claim 8 wherein the amount of said formaldehyde-donating compound used is sufficient to release upon heating at least about 0.35 mole of formaldehyde per mole of said phenol.

11. A stable alkaline concentrate which can be stored at least 35 days and then diluted for use as a tire cord dip bath comprising (1) a latex of a rubbery polymer of butadiene (2) a water-soluble resorcinol-formaldehyde resole resin having about 0.5 mole of formaldehyde per mole of resorcinol, (3) an alkaline catalyst, and (4) a water soluble formaldehyde donating compound having

groups and at least one methylol group and which releases upon heating enough formaldehyde to produce about 0.9 to 1.2 moles total formaldehyde per mole of resorcinol and thereby forms a water-insoluble infusible resin, said concentrate being essentially free of unreacted formaldehyde.

12. A pneumatic rubber tire having a carcass reinforced with nylon cords, said cords being bonded to the rubber portions of said carcass by an adhesive which is applied to the cords prior to building of the tire as an aqueous blend, said blend comprising (1) a latex of a rubbery copolymer of a major amount by weight of a diene hydrocarbon containing conjugated double bonds and a minor amount by weight of a vinyl pyridine, (2) a water-soluble alkaline-catalyzed polyhydric-phenol-aldehyde resole having a molar ratio of formaldehyde to resorcinol between 0.25:1 and 0.75:1, (3) an amount of ammonia sufficient to provide said blend with a pH of at least 9, and (4) an aliphatic water-soluble water-stable formaldehyde-donating compound consisting essentially of carbon, nitrogen, hydrogen and oxygen atoms and having at least one

group and at least one methylol group.

13. In a pneumatic rubber tire having a carcass including synthetic fiber cord fabric embedded in a rubber carcass composition, an adhesive for bonding said cord fabric to said rubber composition, said adhesive being formed as a blend of (1) a latex of a rubbery copolymer of a major amount by weight of a diene hydrocarbon containing conjugated double bonds and a minor amount by weight of a vinyl pyridine, (2) a water-soluble alkaline-catalyzed resorcinol-formaldehyde resole having a molar ratio of formaldehyde to resorcinol between 0.25:1 and 0.75:1, (3) an amount of amomnia sufficient to provide said blend with a pH of at least 9, and (4) an aliphatic water-soluble water-stable formaldehyde-donating compound consisting of carbon, nitrogen, hydrogen, and oxygen atoms and having at least one

group and at least one methylol group, said formaldehyde-donating compound releasing enough formaldehyde during vulcanization of the tire to make the total mole ratio of aldehyde to phenolic compound about 0.9:1 to 1.2:1.

14. A method of making a stable dip bath comprising the steps of (1) forming a water-soluble resole resin by reacting about 0.4 to 0.5 mole of formaldehyde with 1 mole of resorcinol in the presence of an alkaline catalyst for at least 6 hours at 40° to 60° C., (2) forming an alkaline latex adhesive concentrate by mixing said water-soluble resin with a latex of a copolymer of a butadiene and a vinyl pyridine and with an amount of a water-stable formaldehyde donating compound which releases enough formaldehyde to convert said resole resin to a water-insoluble infusible resin upon heating, said formaldehyde donating compound having

groups and methylol groups, (3) thereafter diluting the concentrate with water to form said dip bath, and (4) adding ammonia to provide the dip bath with a pH of at least about 9.

15. A process of bonding a nylon fabric to rubber comprising the steps of (a) forming an adhesive concentrate which contains (1) a latex of a butadiene-vinyl pyridine copolymer, (2) an alkaline-catalyzed water-soluble resorcinol-formaldehyde resin formed by reacting 0.25 to 0.75 mole of formaldehyde per mole of resorcinol, (3) a water-soluble water-stable formaldehyde-donating compound having

groups and methylol groups which breaks down upon heating to release enough formaldehyde to react with said water-soluble resin to form a water-insoluble infusible resin, said concentrate being essentially free of unreacted formaldehyde, (b) adding an amount of water and ammonia sufficient to provide a dilute dip bath with a pH of 9 to 11, (c) passing a nylon fabric through said dip bath to wet the fabric with the aqueous adhesive solution, (d) drying the treated fabric, (e) applying a rubber to the dried adhesive-coated fabric, and (f) thereafter vulcanizing the rubber by application of heat, the mixture of latex, resin and formaldehyde-donating compound being stored at least 11 days before application of the adhesive to the fabric.

16. A process as defined in claim 15, wherein said last-named mixture is stored at least 35 days before being applied to the fabric and wherein said formaldehyde-donating compound is a reaction product of melamine and formaldehyde.

17. A process as defined in claim 15, wherein said resole resin is formed by reacting about 0.6 mole of formaldehyde per mole of resorcinol and wherein said formaldehyde-donating compound releases enough formaldehyde upon heating to make the total formaldehyde-to-resorcinol molar ratio at least about 0.9:1.

18. A process of bonding a nylon fabric to rubber comprising the steps of (1) forming an adhesive concentrate which contains (1) a latex of a butadiene-vinyl pyridine copolymer, (2) an alkaline-catalyzed water-soluble resorcinol-formaldehyde resin formed by reacting 0.4 to 0.5 mole of formaldehyde per mole of resorcinol, (3) a water-soluble water-stable formaldehyde-donating compound having

groups and methylol groups which breaks down upon heating to release enough formaldehyde to react with said water-soluble resin to form a water-insoluble infusible resin, said concentrate being essentially free of unreacted formaldehyde, (b) diluting the concentrate with water while adding an amount of amomnia sufficient to provide a dip bath with a pH of 9 to 11, (c) passing a nylon fabric through said dip bath to wet the fabric with the aqueous adhesive solution, (d) drying the treated fabric, (e) applying a rubber to the dried adhesive-coated fabric, and (f) thereafter vulcanizing the rubber by application of heat, the mixture of latex, resin and formaldehyde-donating compound being stored many days before application of the adhesive to the nylon fabric.

19. A stable alkaline adhesive concentrate which can be stored for a long period of time and then diluted for use as a tire cord dip bath comprising: (1) a latex of a rubbery copolymer of butadiene and a vinyl pyridine, (2) a water-soluble alkaline-catalyzed resorcinol-formaldehyde resole resin made by reacting about one-half mole of formaldehyde per mole of resorcinol, and (3) a water-soluble water-stable compound capable of releasing upon heating at least about 0.4 mole of formaldehyde which further reacts with the water-soluble resin to form a water-insoluble infusible resin, said water-stable compound comprising a reaction product of melamine and formaldehyde and providing said concentrate with a shelf life of at least 11 days, said concentrate being essentially free of unreacted formaldehyde.

References Cited by the Examiner

UNITED STATES PATENTS 2,385,374   9/45   Rhodes _____ 156—189
2,561,215   7/51   Mighton _____ 161—260

MURRAY TILLMAN, *Primary Examiner.*

WILLIAM H. SHORT, *Examiner.*